US012591163B2

(12) United States Patent
Liang et al.

(10) Patent No.: US 12,591,163 B2
(45) Date of Patent: Mar. 31, 2026

(54) ELECTRO-OPTIC MODULATOR

(71) Applicant: NANJING LYCORE TECHNOLOGIES CO., LTD., Nanjing (CN)

(72) Inventors: Hanxiao Liang, Nanjing (CN); Yipin Song, Nanjing (CN); Yingcong Zhou, Nanjing (CN); Haicang Wu, Nanjing (CN); Wenhao Mao, Nanjing (CN); Shiwei Song, Nanjing (CN); Weiqi Sun, Nanjing (CN); Qingyang Yu, Nanjing (CN); Zhouyu Zhang, Nanjing (CN)

(73) Assignee: NANJING LYCORE TECHNOLOGIES CO., LTD., Nanjing (CN)

( * ) Notice: Subject to any disclaimer, the term of this patent is extended or adjusted under 35 U.S.C. 154(b) by 287 days.

(21) Appl. No.: 18/529,452

(22) Filed: Dec. 5, 2023

(65) Prior Publication Data

US 2024/0192569 A1     Jun. 13, 2024

(30) Foreign Application Priority Data

Dec. 8, 2022    (CN) .......................... 202223297973.5
Feb. 21, 2023    (CN) .......................... 202320288592.6

(51) Int. Cl.
*G02F 1/225*          (2006.01)
*G02F 1/21*           (2006.01)

(52) U.S. Cl.
CPC .............. *G02F 1/225* (2013.01); *G02F 1/212* (2021.01)

(58) Field of Classification Search
CPC ........ G02F 1/212; G02F 1/225; G02F 1/2252; G02F 1/2255; G02F 1/2257
See application file for complete search history.

(56) References Cited

U.S. PATENT DOCUMENTS

2018/0341164 A1    11/2018  Williams et al.
2021/0157177 A1     5/2021  Kharel et al.

FOREIGN PATENT DOCUMENTS

CN            111665646 B   *   8/2021   ............... G02F 1/03
WO    WO 2020/181690          9/2020
WO    WO 2021/243493          12/2021

OTHER PUBLICATIONS

Translation of CN-111665646-B (Year: 2021).*
Extended European Search Report in European Appln. No. 23215233.0, mailed on Mar. 20, 2024, 11 pages.

* cited by examiner

*Primary Examiner* — Chad H Smith
(74) *Attorney, Agent, or Firm* — Fish & Richardson P.C.

(57)          ABSTRACT

An electro-optic modulator is provided, which includes a waveguide layer and an electrode layer, where the electrode layer includes: a plurality of first sub-electrodes and a plurality of first connecting electrodes; a plurality of second sub-electrodes and a plurality of second connecting electrodes; a plurality of third sub-electrodes and a plurality of third connecting electrodes; and a plurality of fourth sub-electrodes and a plurality of fourth connecting electrodes, where the plurality of first sub-electrodes and the plurality of fourth sub-electrodes are grounded, the plurality of second sub-electrodes and the plurality of third sub-electrodes receive differential signals, the plurality of first sub-electrodes and the plurality of second sub-electrodes form a first electric field therebetween, and the plurality of third sub-electrodes and the plurality of fourth sub-electrodes form a second electric field therebetween; and the waveguide layer includes a first waveguide arm and a second waveguide arm.

13 Claims, 8 Drawing Sheets

A-A

002

A-A

100

ELECTRO-OPTIC MODULATOR

CROSS-REFERENCE TO RELATED APPLICATION

This application claims priority to Chinese Patent Application No. 202320288592.6, filed on Feb. 21, 2023 and Chinese Patent Application No. 202223297973.5, filed on Dec. 8, 2022. Both of the aforementioned applications are hereby incorporated by reference in their entireties for all purpose.

TECHNICAL FIELD

The present disclosure relates to the technical field of optical communications, and in particular, to an electro-optic modulator.

BACKGROUND

In recent years, with rapid development of emerging network application services such as Internet of Things, driverless, telemedicine, and distance education, higher requirements have been put forward for high-speed and large-capacity communication technology. Optical communications have achieved rapid development in the direction of high-speed and large-capacity communications due to their characteristics such as a large bandwidth, high reliability, a low cost, and a strong anti-interference ability. How to load high-speed electrical signals onto optical carriers is a core research content.

An electro-optic modulator is a modulator that is made based on an electro-optic effect of electro-optic materials. The electro-optic effect means that when a voltage is applied to an electro-optic material such as, for example, a lithium niobate crystal, a gallium arsenide crystal, or a lithium tantalate crystal, a refractive index of the electro-optic material will vary, resulting in a change in characteristics of light waves passing through the electro-optic material. The use of the electro-optic effect allows modulation of parameters, such as a phase, an amplitude, an intensity, and a polarization state, of optical signals.

With increasingly urgent requirements for the high-speed and large-capacity communication technology, higher requirements have been put forward for a low loss and a working performance of the electro-optic modulator.

SUMMARY

Embodiments of the present disclosure provide an electro-optic modulator to reduce a transmission loss of the electro-optic modulator and improve a working performance of the electro-optic modulator.

The electro-optic modulator provided in the embodiments of the present disclosure includes a substrate, an isolating layer, a waveguide layer, and an electrode layer which are arranged in sequence, where the electrode layer includes: a plurality of first sub-electrodes arranged in sequence in a first direction and a plurality of first connecting electrodes connected to the plurality of first sub-electrodes in an intersecting manner in a one-to-one correspondence; a plurality of second sub-electrodes arranged in sequence in the first direction and a plurality of second connecting electrodes connected to the plurality of second sub-electrodes in an intersecting manner in a one-to-one correspondence; a plurality of third sub-electrodes arranged in sequence in the first direction and a plurality of third connecting electrodes connected to the plurality of third sub-electrodes in an intersecting manner in a one-to-one correspondence; and a plurality of fourth sub-electrodes arranged in sequence in the first direction and a plurality of fourth connecting electrodes connected to the plurality of fourth sub-electrodes in an intersecting manner in a one-to-one correspondence, where the plurality of first sub-electrodes and the plurality of fourth sub-electrodes are configured to be grounded, the plurality of second sub-electrodes and the plurality of third sub-electrodes are configured to receive differential signals, the plurality of first sub-electrodes and the plurality of second sub-electrodes are configured to form a first electric field therebetween, and the plurality of third sub-electrodes and the plurality of fourth sub-electrodes are configured to form a second electric field therebetween that has an opposite direction to that of the first electric field; and the waveguide layer includes a first waveguide arm and a second waveguide arm, where in a direction perpendicular to the substrate, the first waveguide arm is located between the plurality of first sub-electrodes and the plurality of second sub-electrodes and does not intersect with the plurality of first connecting electrodes and the plurality of second connecting electrodes, and the second waveguide arm is located between the plurality of third sub-electrodes and the plurality of fourth sub-electrodes and intersects with the plurality of third connecting electrodes and the plurality of fourth connecting electrodes.

These and other aspects of the present disclosure will be clear from the embodiments described below, and will be clarified with reference to the embodiments described below.

BRIEF DESCRIPTION OF THE DRAWINGS

More details, features, and advantages of the present disclosure are disclosed in the following description of example embodiments with reference to the accompany drawings, in which.

LIST OF REFERENCE SIGNS

Figure 1:
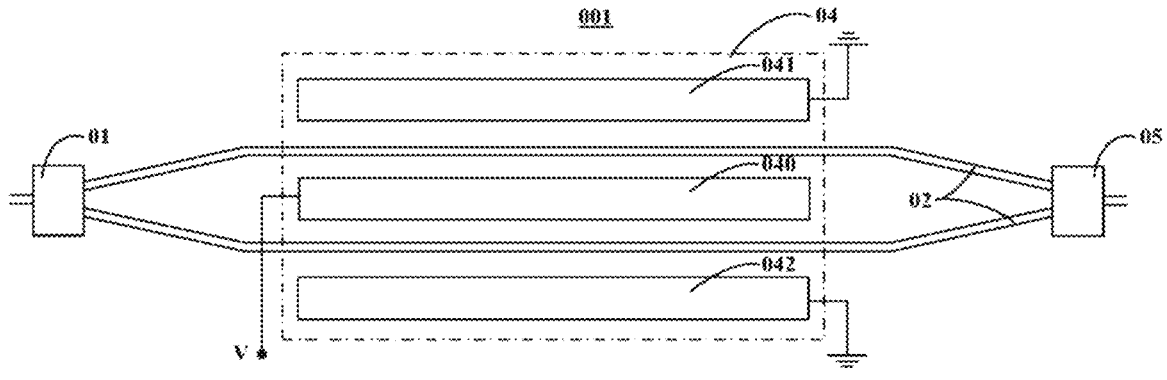
FIG. 1 is a schematic structural view of a conventional electro-optic modulator.

In the related art:
001—Mach-Zehnder modulator; 02—Waveguide arm; 01—Optical-splitting element; 04—Modulation electrode;
040—Signal electrode; 041—First ground electrode; 042—Second ground electrode; and 05—Optical-combining element.

In comparative examples of the present disclosure:
002—Electro-optic modulator; 241—First ground electrode; 242—First signal electrode; 243—Second ground electrode;
244—Second signal electrode; 245—Third ground electrode; 231—First waveguide arm; and 232—Second waveguide arm.

In the embodiments of the present disclosure:
100—Electro-optic modulator; 110—Substrate; 120—Isolating layer; 130—Waveguide layer; 131—First waveguide arm;
132—Second waveguide arm; 133—Slab waveguide; 140—Electrode layer; 141—First ground electrode; 11—First main electrode;
12—First connecting electrode; 13—First sub-electrode; 142—First signal electrode; 21—Second main electrode;
22—Second connecting electrode; 23—Second sub-electrode; 143—Second signal electrode; 31—Third main electrode;
32—Third connecting electrode; 33—Third sub-electrode; 144—Second ground electrode; 41—Fourth main electrode;
42—Fourth connecting electrode; 43—Fourth sub-electrode; 145—Third ground electrode; 150—Patterned dielectric layer;
741—First ground electrode; 742—First signal electrode; 743—Second ground electrode; 744—Second signal electrode;
745—Third ground electrode; 7430—First main electrode; 7420—Second main electrode; and 7440—Third main electrode.

DETAILED DESCRIPTION

Only some example embodiments are briefly described below. As can be appreciated by those skilled in the art, the described embodiments can be modified in various ways without departing from the spirit or scope of the present disclosure. Accordingly, the accompanying drawings and the description are considered as illustrative in nature, and not as restrictive.

Electro-optic modulation related technologies have been widely developed and applied in the fields of optical communications, microwave photonics, laser beam deflection, wavefront modulation, etc. A Mach-Zehnder modulator is one type of electro-optic modulator, in which an input optical signal is split into two branch optical signals, which then enter two waveguide arms, respectively. The two waveguide arms each are made of an electro-optic material, with a refractive index changing with an applied modulation voltage. The change in the refractive index of the waveguide arms may lead to a change in phases of the branch optical signals. Therefore, an output from the convergence of the two branch optical signals is an interference signal with an intensity changing with the modulation voltage. In brief, the Mach-Zehnder modulator can implement modulation of different sidebands by controlling the modulation voltage applied to the two waveguide arms. As a device for converting electrical signals into optical signals, the Mach-Zehnder modulator is one of the common core devices in optical interconnection, optical computing and optical communication systems.

FIG. 1 shows a schematic structural view of a conventional Mach-Zehnder modulator. Ideally, the Mach-Zehnder modulator 001 has two waveguide arms 02 that are identical to each other. When the Mach-Zehnder modulator 001 is not working, neither of the two waveguide arms 02 undergoes an electro-optic effect. Input light is equally split into two branch optical signals after passing through an optical-splitting element 01, and the two branch optical signals are still in the same phase after each of the two branch optical signals passes through one waveguide arm 02. Therefore, a coherently enhanced signal for the two branch optical signals will be output from an optical-combining element 05. When the Mach-Zehnder modulator 001 is working, a modulation electrode 04 (for example, including a signal electrode 040, a first ground electrode 041, and a second ground electrode 042) applies a modulation voltage to the two waveguide arms 02, and the two branch optical signals may differ in phase by an odd or even multiple of π after each of the two branch optical signals passes through one waveguide arm 02. When the two branch optical signals differ in phase by an even multiple of π, the optical-combining element 05 outputs a coherently enhanced signal for the two branch optical signals. When the two branch optical signals differ in phase by an odd multiple of π, the optical-combining element 05 outputs a coherently suppressed signal for the two branch optical signals.

In the electro-optic modulator, a transmission speed of the electrical signals is mainly affected by a dielectric constant and structure of a material, and a transmission speed of the optical signals is mainly affected by the refractive index and structure of the material. Electro-optic modulators in the related art are made of an electro-optic material with a relatively small refractive index and a relatively large dielectric constant, which leads to a high transmission speed of the optical signals and a low transmission speed of the electrical signals, making it difficult to achieve a better match between the transmission speeds of the two, thus resulting in a relatively large transmission loss of the electro-optic modulator and a sub-optimal working performance of the device.

In view of this, embodiments of the present disclosure provide an electro-optic modulator, which can reduce a transmission loss of the electro-optic modulator and improve the working performance of the electro-optic modulator.

Figure 2:
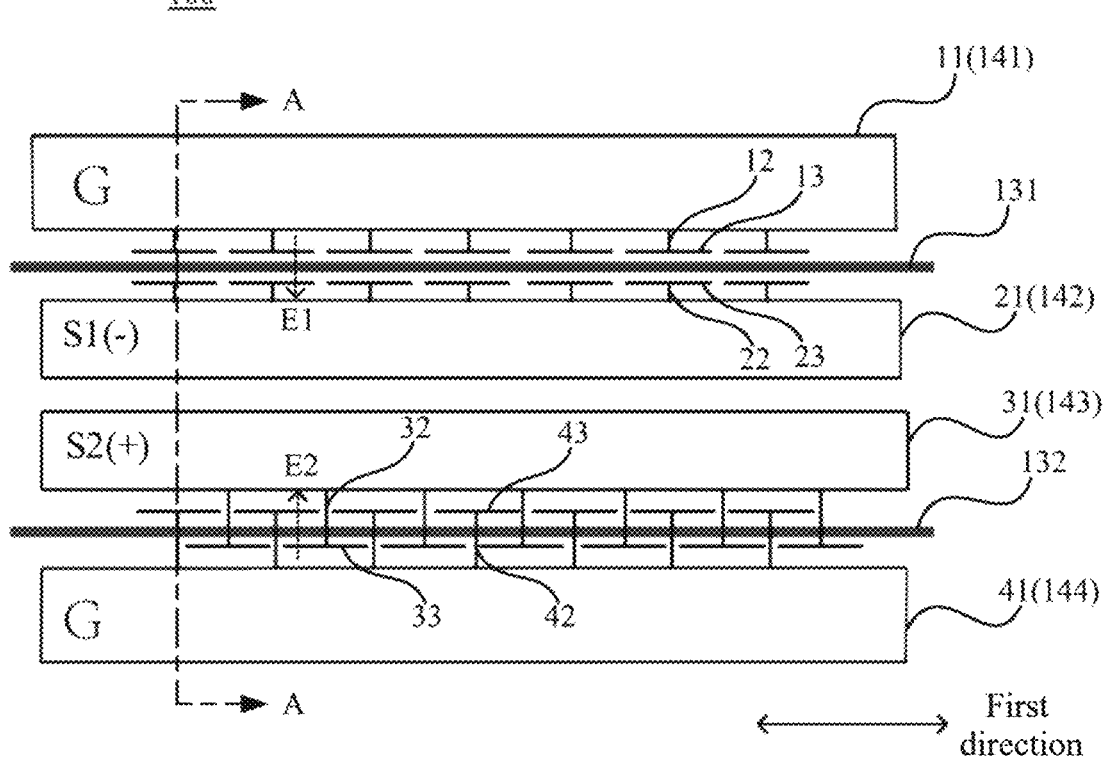
FIG. 2 is a schematic top view of a partial structure of an electro-optic modulator according to some embodiments of the present disclosure.
Figure 3:
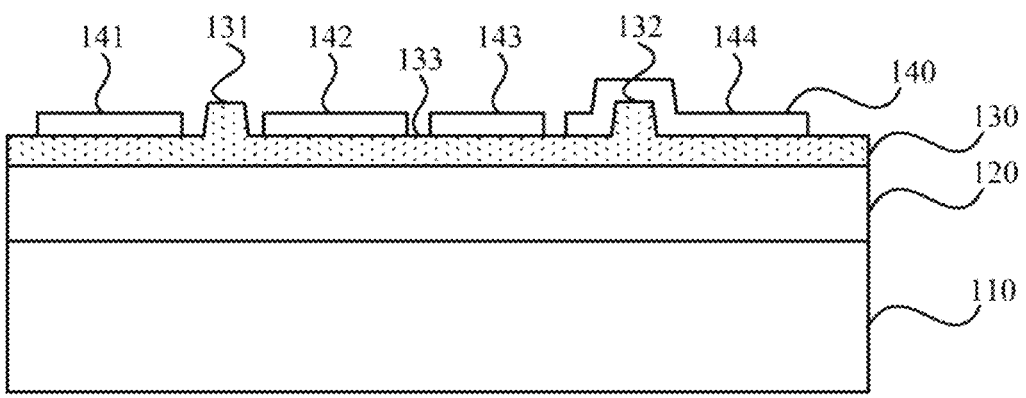
FIG. 3 is a schematic view of a cross-sectional structure of the electro-optic modulator according to some embodiments of the present disclosure at A-A in FIG. 2.

As shown in FIGS. 2 and 3, the electro-optic modulator 100 provided in some embodiments of the present disclosure includes a substrate 110, an isolating layer 120, a waveguide layer 130, and an electrode layer 140 which are arranged in sequence.

In the embodiments of the present disclosure, the electrode layer 140 includes: a plurality of first sub-electrodes 13 arranged in sequence in a first direction and a plurality of first connecting electrodes 12 connected to the plurality of first sub-electrodes 13 in an intersecting manner in a one-to-one correspondence; a plurality of second sub-electrodes 23 arranged in sequence in the first direction and a plurality of second connecting electrodes 22 connected to the plurality of second sub-electrodes 23 in an intersecting manner in a one-to-one correspondence; a plurality of third sub-electrodes 33 arranged in sequence in the first direction and a plurality of third connecting electrodes 32 connected to the plurality of third sub-electrodes 33 in an intersecting manner in a one-to-one correspondence; and a plurality of fourth sub-electrodes 43 arranged in sequence in the first direction and a plurality of fourth connecting electrodes 42 connected to the plurality of fourth sub-electrodes 43 in an intersecting manner in a one-to-one correspondence.

The plurality of first sub-electrodes 13 and the plurality of fourth sub-electrodes 43 are configured to be grounded, the plurality of second sub-electrodes 23 and the plurality of third sub-electrodes 33 are configured to receive differential signals (indicated by S1 and S2, respectively), the plurality of first sub-electrodes 13 and the plurality of second sub-electrodes 23 are configured to form a first electric field E1 therebetween, and the plurality of third sub-electrodes 33 and the plurality of fourth sub-electrodes 43 are configured to form a second electric field E2 therebetween that has an opposite direction to that of the first electric field.

The waveguide layer 130 includes a first waveguide arm 131 and a second waveguide arm 132, where in a direction perpendicular to the substrate 110, the first waveguide arm 131 is located between the plurality of first sub-electrodes 13 and the plurality of second sub-electrodes 23 (that is, located in the first electric field E1) and does not intersect with the plurality of first connecting electrodes 12 and the plurality of second connecting electrodes 22, and the second waveguide arm 132 is located between the plurality of third sub-electrodes 33 and the plurality of fourth sub-electrodes 43 (that is, located in the second electric field E2) and intersects with the plurality of third connecting electrodes 32 and the plurality of fourth connecting electrodes 42.

In the embodiments shown in FIGS. 2 and 3, the electrode layer adopts an electrode arrangement design of GSSG (G representing a ground electrode, and S representing a signal electrode). The electrode layer 140 includes a first ground electrode 141, a first signal electrode 142, a second signal electrode 143, and a second ground electrode 144 which are arranged in sequence. The first signal electrode 142 and the second signal electrode 143 are configured to receive differential signals. The first ground electrode 141 includes a first main electrode 11, the plurality of first connecting electrodes 12 connected to the first main electrode 11, and the plurality of first sub-electrodes 13. The first signal electrode 142 includes a second main electrode 21, the plurality of second connecting electrodes 22 connected to the second main electrode 21, and the plurality of second sub-electrodes 23. The second signal electrode 143 includes a third main electrode 31, the plurality of third connecting electrodes 32 connected to the third main electrode 31, and the plurality of third sub-electrodes 33. The second ground electrode 144 includes a fourth main electrode 41, the plurality of fourth connecting electrodes 42 connected to the fourth main electrode 41, and the plurality of fourth sub-electrodes 43.

The basic structure of the electro-optic modulator 100 generally further includes an optical-splitting element and an optical-combining element (they are not shown in the figures, and the connection of the optical-splitting element and the optical-combining element to the first waveguide arm 131 and the second waveguide arm 132 can be as shown with reference to FIG. 1). The optical-splitting element includes at least a signal input end, a first optical-splitting output end, and a second optical-splitting output end. The optical-combining element includes at least a first optical-splitting input end, a second optical-splitting input end, and a signal output end. One end of the first waveguide arm 131 and one end of the second waveguide arm 132 are connected to the first optical-splitting output end and the second optical-splitting output end in a one-to-one correspondence, and the other end of the first waveguide arm 131 and the other end of the second waveguide arm 132 are connected to the first optical-splitting input end and the second optical-splitting input end in a one-to-one correspondence.

In the embodiments of the present disclosure, the first ground electrode 141, the first signal electrode 142, the second signal electrode 143, and the second ground electrode 144 extend in the first direction as a whole, and their respective main electrodes may be arranged parallel to each other. The first signal electrode 142 and the second signal electrode 143 are used to receive differential signals. To be specific, the first signal electrode 142 and the second signal electrode 143 respectively receive radio frequency voltage signals S1 and S2 that are of the same amplitude and opposite phases (indicated by symbols "−" and "+"), and the radio frequency voltage signals S1 and S2 are thus differential signals.

The material of the waveguide layer 130 may include an electro-optic material, such as lithium niobate, lithium tantalate or potassium titanyl phosphate. When differential signals (such as the radio frequency voltage signals S1 and S2 described above) are input into the first signal electrode 142 and the second signal electrode 143, and the first ground electrode 141 and the second ground electrode 144 are grounded (indicated by "G" in the figure), the first waveguide arm 131 is located in a first electric field E1 formed by the first signal electrode 142 and the first ground electrode 141, and the second waveguide arm 132 is located in a second electric field E2 formed by the second signal electrode 143 and the second ground electrode 144. As shown in the figure, the structural design of the sub-electrodes of the first ground electrode 141, the first signal electrode 142, the second signal electrode 143, and the second ground electrode 144 enables the direction of the first electric field E1 to be exactly opposite to that of the second electric field E2. The refractive index of the first waveguide arm 131 and the refractive index of the second waveguide arm 132 vary with the differential signals S1 and S2 respectively received by the first signal electrode 142 and the second signal electrode 143, allowing the phases of the branch optical signals transmitted therein to be modulated, such that the two branch optical signals achieve a target phase difference when they arrive at the optical-combining element, the target phase difference being, for example, an odd or even multiple of π.

In the embodiments of the present disclosure, with the structural design of the sub-electrodes of the first ground electrode 141, the first signal electrode 142, the second signal electrode 143, and the second ground electrode 144, not only can the first electric field E1 and the second electric field E2 be designed to have opposite directions, but also a spacing between the signal electrode and the ground electrode can be shortened and the two electrodes are made as close to each other as possible, such that the strength of the electric fields can be increased, and the transmission loss of the electrical signals can be reduced.

In addition, some characteristics (such as an impedance and a transmission speed) of the electrode structure are closely related to specific design parameters (such as a shape, a size, and a number) of the sub-electrodes, which can be flexibly adjusted according to actual design requirements, such that the electro-optic modulator 100 has an impedance that is the same as or similar to an impedance at an input end of the electro-optic modulator as far as possible, to compensate for the difference in the transmission speeds of the optical signals and the electrical signals to a certain extent, achieving a match between the transmissions of the two as much as possible.

Figure 4:
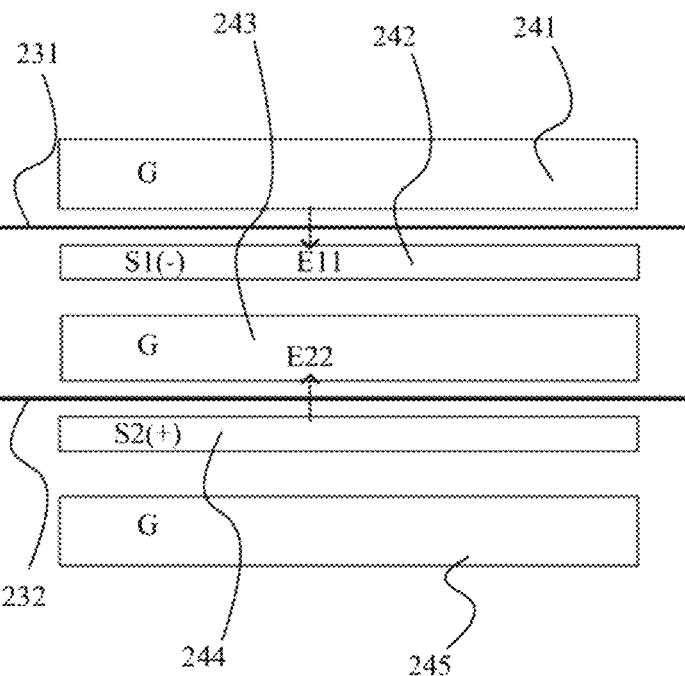
FIG. 4 is a schematic top view of a partial structure of an electro-optic modulator according to some comparative examples of the present disclosure.

As shown in FIG. 4, in the electro-optic modulator 002 in some comparative examples of the present disclosure, the electrode layer adopts an electrode arrangement of GSGSG. To be specific, a first ground electrode 241, a first signal electrode 242, a second ground electrode 243, a second signal electrode 244, and a third ground electrode 245 are arranged in sequence. The first ground electrode 241 and the first signal electrode 242 form a first electric field E11 therebetween, the second ground electrode 243 and the second signal electrode 244 form a second electric field E22 therebetween that has an opposite direction to the first electric field E11, a first waveguide arm 231 is located between the first ground electrode 241 and the first signal electrode 242, and a second waveguide arm 232 is located between the second ground electrode 243 and the second signal electrode 244. In the structure of such electro-optic modulator 002, the third ground electrode 245 is also necessarily provided in order to shield or reduce the crosstalk that may be generated, due to external factors, with respect to the second signal electrode 244. Therefore, three ground electrodes are included in the structural design of the electro-optic modulator 002, which makes the overall size of the electro-optic modulator 002 relatively large in the extension direction perpendicular to the waveguide arm.

Figure 5:
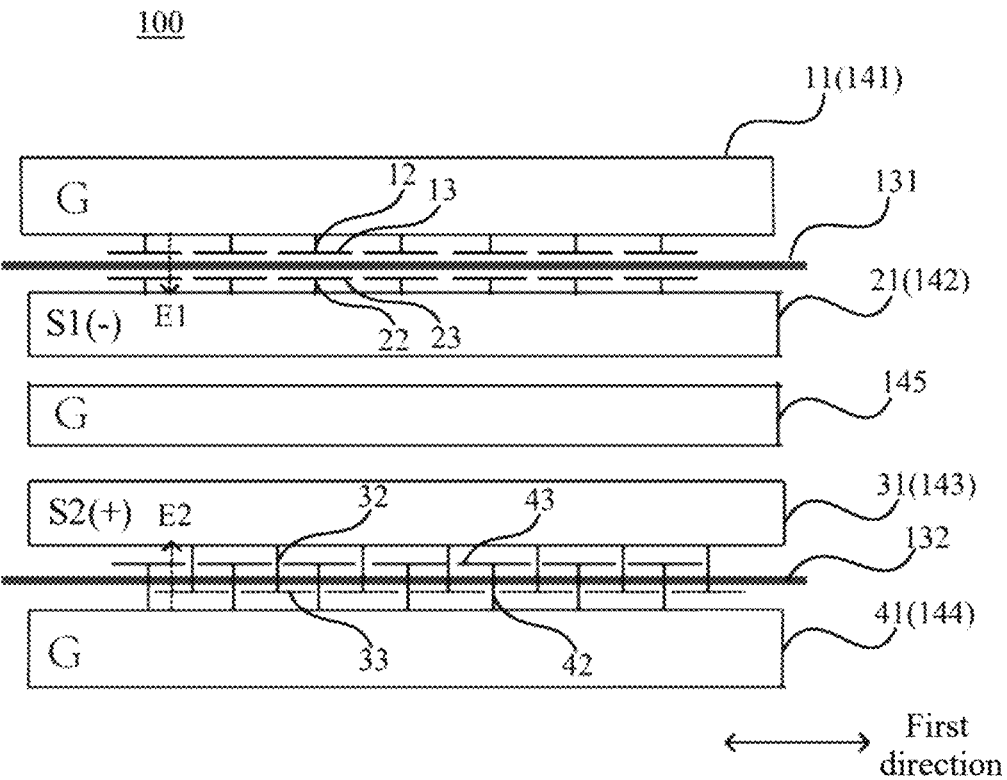
FIG. 5 is a schematic top view of a partial structure of an electro-optic modulator according to some other embodiments of the present disclosure.

However, with the design of the electro-optic modulator 100 in the embodiments of the present disclosure, with reference to FIG. 2, a minimum of two ground electrodes may be included, which allows the electro-optic modulator 100 to be designed with a smaller size as a whole as compared with the above comparative example In some embodiments of the present disclosure, as shown in FIG. 5, the electrode layer 140 may also include a third ground electrode 145 located between the first signal electrode 142 and the second signal electrode 143, that is, adopting an electrode arrangement of GSGSG. In this way, the third ground electrode 145 is located between the first signal electrode 142 and the second signal electrode 143, such that crosstalk that may be generated between the first signal electrode and the second signal electrode can be shielded or reduced, thereby improving the stability of differential signal transmission, and facilitating a further reduction in the transmission loss. In order to minimize the overall size of the electro-optic modulator 100, the third ground electrode 145 may be designed to have a relatively small width.

As shown in FIG. 2, in some embodiments of the present disclosure, each first sub-electrode 13 is in a T-shaped connection with a corresponding first connecting electrode 12, each second sub-electrode 23 is in a T-shaped connection with a corresponding second connecting electrode 22, each third sub-electrode 33 is in a T-shaped connection with a corresponding third connecting electrode 32, and each fourth sub-electrode 43 is in a T-shaped connection with a corresponding fourth connecting electrode 42.

In some other embodiments of the present disclosure, each first sub-electrode may also be in an L-shaped connection with a corresponding first connecting electrode, and similarly, each second sub-electrode may also be in an L-shaped connection with a corresponding second connecting electrode, each third sub-electrode may also be in an L-shaped connection with a corresponding third connecting electrode, and each fourth sub-electrode may also be in an L-shaped connection with a corresponding fourth connecting electrode.

The shape of the sub-electrodes can be flexibly designed and the design parameters of the sub-electrodes can be adjusted according to actual design requirements, such that the electro-optic modulator 100 has an impedance that is the same as or similar to an impedance at an input end of the electro-optic modulator as much as possible, to compensate for the difference in the transmission speeds of the optical signals and the electrical signals, achieving a match between the transmissions of the two as much as possible.

As shown in FIG. 2, in some embodiments, in an extension direction of the first waveguide arm 131 and the second waveguide arm 132 (i.e., in the first direction), the plurality of first sub-electrodes 13 are arranged opposite the plurality of second sub-electrodes 23 in a one-to-one correspondence, and the plurality of third sub-electrodes 33 are arranged alternately with the plurality of fourth sub-electrodes 43. This design allows for a relatively large effective overlap area between the plurality of first sub-electrodes 13 and the plurality of second sub-electrodes 23, and between the plurality of third sub-electrodes 33 and the plurality of fourth sub-electrodes 43, such that the strengths of the formed first electric field E1 and second electric field E2 can be increased, and the transmission loss of the electrical signals can be minimized.

Figure 6:
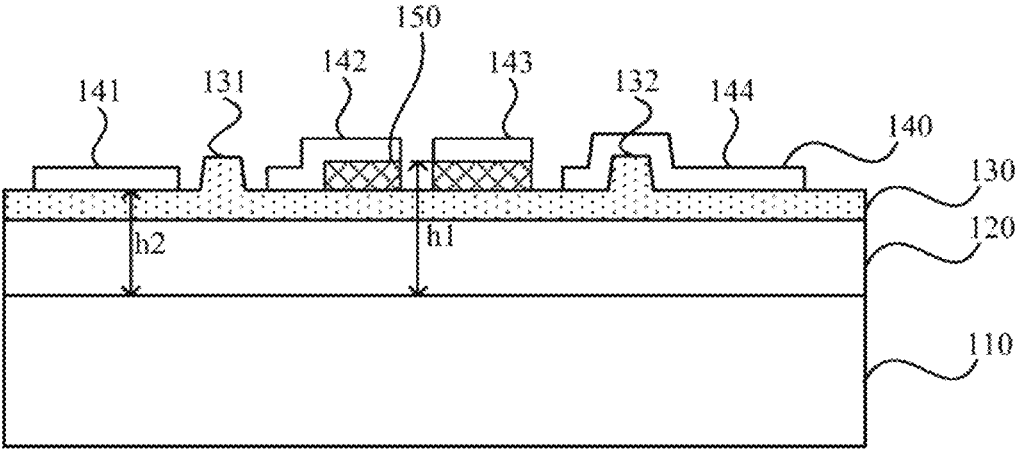
FIG. 6 is a schematic view of a cross-sectional structure of an electro-optic modulator according to still some other embodiments of the present disclosure at A-A in FIG. 2.

In some embodiments of the present disclosure, with reference to FIG. 6, a distance from each of the second main electrode 21 and the third main electrode 31 to the substrate 110 is h1, and a distance from each of the first main electrode 11 and the fourth main electrode 41 to the substrate 110 is h2, where h1≠h2.

The main electrodes of the signal electrodes are arranged at different heights from the main electrodes of the ground electrodes, which facilitates flexible regulation and design of electrical signal transmission using this height difference through the structural design, allowing the difference in the transmission speeds of the optical signals and the electrical signals to be reduced, and thus making the two achieve a good match therebetween.

As shown in FIG. 6, in some embodiments of the present disclosure, the electro-optic modulator 100 further includes: a patterned dielectric layer 150 located between the waveguide layer 130 and the electrode layer 140, the patterned dielectric layer 150 having a lower dielectric constant than the waveguide layer 130. In a direction perpendicular to the substrate 110, the patterned dielectric layer 150 has no overlap with the first main electrode 11 and the fourth main electrode 41, and at least a portion of the patterned dielectric layer 150 overlaps the second main electrode 21 and the third main electrode 31. In this embodiment, using a difference in the thickness of the patterned dielectric layer 150 in different regions, the second main electrode 21 and the third main electrode 31 are raised such that they are arranged at different heights from the first main electrode 11 and the fourth main electrode 41.

In some other embodiments of the present disclosure, the patterned dielectric layer may also be designed such that it has no overlap with the second main electrode and the third main electrode, and at least a portion of the patterned dielectric layer overlaps the first main electrode and the fourth main electrode. In this embodiment, using a difference in the thickness of the patterned dielectric layer in different regions, the first main electrode and the fourth main electrode are raised such that they are arranged at different heights from the second main electrode and the third main electrode.

It should be noted that when the electrode layer of the electro-optic modulator 100 adopts the design scheme shown in FIG. 5, a distance from the third ground electrode 145 of the electrode layer to the substrate 110 may also be designed to be h1, that is, the third ground electrode is arranged at the same height as the first main electrode 11 and the fourth main electrode 41, and thus at different heights from the second main electrode 21 and the third main electrode 31.

Figure 7:
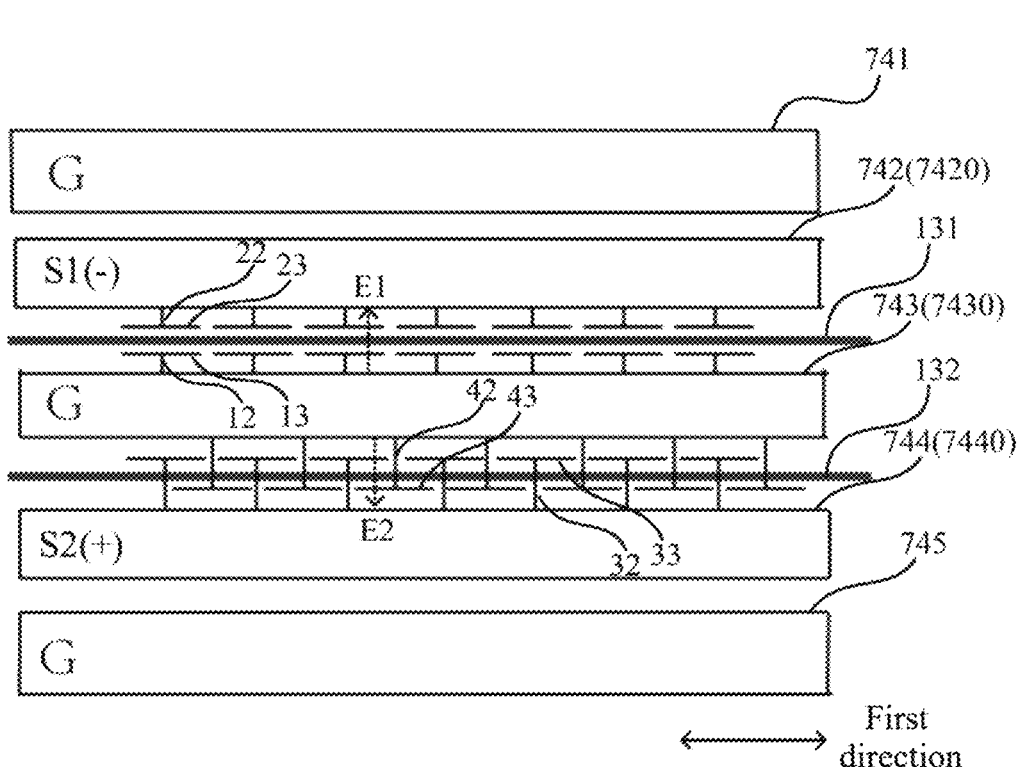
FIG. 7 is a schematic top view of a partial structure of an electro-optic modulator according to yet still some other embodiments of the present disclosure.

As shown in FIG. 7, in some embodiments of the present disclosure, the electrode layer of the electro-optic modulator 100 adopts an electrode arrangement design of GSGSG. The electrode layer includes a first ground electrode 741, a first signal electrode 742, a second ground electrode 743, a second signal electrode 744, and a third ground electrode 745 which are arranged in sequence. The first signal electrode 742 and the second signal electrode 744 are configured to receive differential signals (indicated by S1 and S2, respectively). The second ground electrode 743 includes a first main electrode 7430, the plurality of first connecting electrodes 12 located on one side of the first main electrode 7430 and connected to the first main electrode 7430, and the plurality of first sub-electrodes 13, and the plurality of fourth connecting electrodes 42 located on the other side of the first main electrode 7430 and connected to the first main electrode 7430, and the plurality of fourth sub-electrodes 43. The first signal electrode 742 includes a second main electrode 7420, the plurality of second connecting electrodes 22 connected to the second main electrode 7420, and the plurality of second sub-electrodes 23. The second signal electrode 744 includes a third main electrode 7440, the plurality of third connecting electrodes 32 connected to the third main electrode 7440, and the plurality of third sub-electrodes 33.

As shown in FIG. 7, the plurality of first sub-electrodes 13 and the plurality of second sub-electrodes 23 are configured to form a first electric field E1 therebetween, and the plurality of third sub-electrodes 33 and the plurality of fourth sub-electrodes 43 are configured to form a second electric field E2 therebetween that has an opposite direction to that of the first electric field. The first waveguide arm 131 is located between the plurality of first sub-electrodes 13 and the plurality of second sub-electrodes 23, and thus in the first electric field E1. The second waveguide arm 132 is located between the plurality of third sub-electrodes 33 and the plurality of fourth sub-electrodes 43, and thus in the second electric field E2.

In these embodiments, by means of the structural design of the electrode layer, not only can the first electric field E1 and the second electric field E2 be designed to have opposite directions, but also the spacing between the signal electrode and the ground electrode can be shortened and the two electrodes are made as close to each other as possible, such that the strength of the electric fields can be increased, and the transmission loss of the electrical signals can be reduced.

In some embodiments, a distance from each of the second main electrode 7420 and the third main electrode 7440 to the substrate is h3, and a distance from each of the first ground electrode 741, the third ground electrode 745, and the first main electrode 7430 to the substrate is h4, where h3≠h4. To be specific, the main electrodes of the first ground electrode, the third ground electrode, and the second ground electrode are arranged at different heights from the main electrodes of the two signal electrodes. This facilitates flexible regulation and design of electrical signal transmission using this height difference through the structural design, allowing the difference in the transmission speeds of the optical signals and the electrical signals to be reduced, and thus making the two achieve a good match therebetween.

In the embodiments of the present disclosure, the specific product form of the electro-optic modulator 100 is not limited, for example, it can be designed as a stripe electro-optic modulator or a folding-type electro-optic modulator based on the above concept, where the folding-type electro-optic modulator may include one or more bent portions.

In some embodiments, an electrode layer of the folding-type electro-optic modulator adopts an electrode arrangement design of GSSG, and various sub-electrodes and connecting electrodes can be designed with reference to the embodiment shown in FIG. 2, in which the first main electrode 11, the second main electrode 21, the third main electrode 31, and the fourth main electrode 41 are in a folded form as a whole (with the folding form not shown in the figure) and do no intersect with each other.

On the basis of the electrode arrangement design of GSSG, in some embodiments, the first waveguide arm 131, the second waveguide arm 132, the first main electrode 11, the second main electrode 21, the third main electrode 31, and the fourth main electrode 41 are designed to not intersect with each other and to have substantially synchronized bends.

On the basis of the electrode arrangement design of GSSG, in some other embodiments, the first waveguide arm 131 and/or the second waveguide arm 132 may intersect with one or more of the first main electrode 11, the second main electrode 21, the third main electrode 31, and the fourth main electrode 41, to form a bending delay. In this way, a transmission speed of waveguides and the transmission speed of the electrodes can be flexibly adjusted to achieve a match therebetween as much as possible, thereby reducing the transmission loss.

Figure 8A:
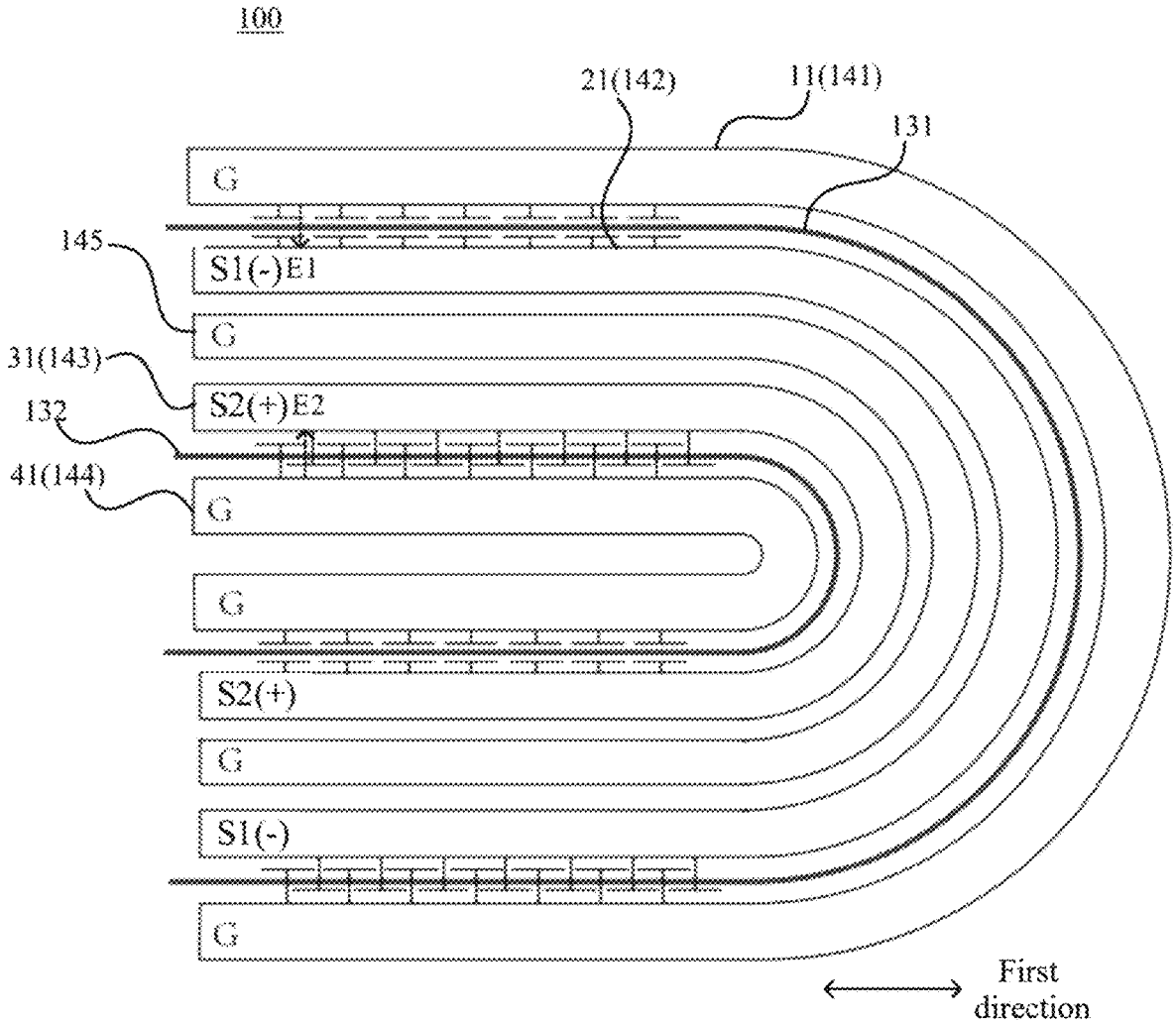
FIG. 8A is a schematic top view of a partial structure of an electro-optic modulator according to yet still some other embodiments of the present disclosure.

As shown in FIG. 8A, in some embodiments of the present disclosure, the electro-optic modulator 100 is a folding-type electro-optic modulator. An electrode layer of the folding-type electro-optic modulator adopts an electrode arrangement design of GSGSG, and each of sub-electrodes and each of connecting electrodes are designed in a similar manner to that in the embodiment shown in FIG. 5, in which the first main electrode 11, the second main electrode 21, the third ground electrode 145, the third main electrode 31, and the fourth main electrode 41 are in a folded form as a whole and do no intersect with each other.

In this embodiment, the first waveguide arm 131, the second waveguide arm 132, the first main electrode 11, the second main electrode 21, the third main electrode 31, and the fourth main electrode 41 are designed to not intersect with each other and to have substantially synchronized bends.

Figure 8B:
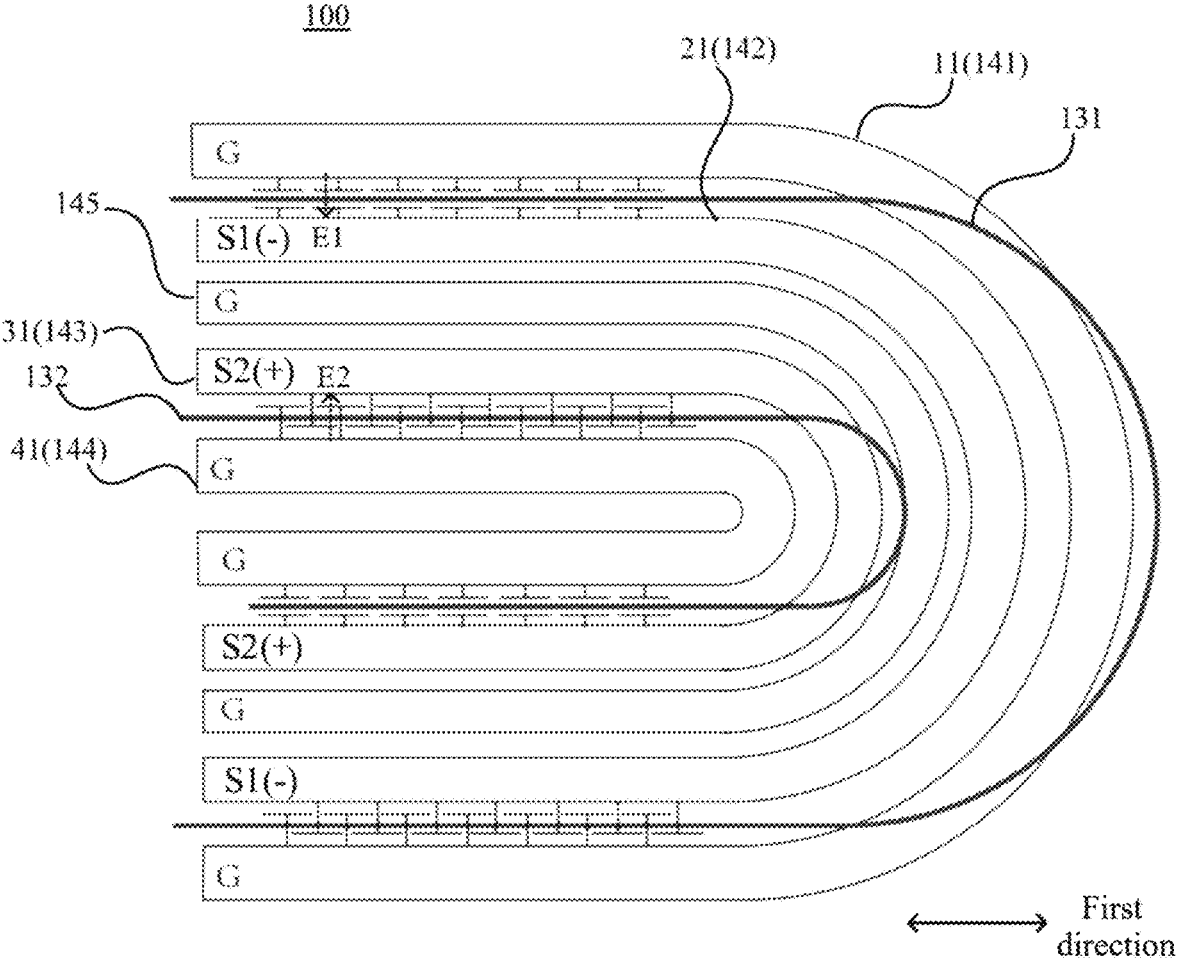
FIG. 8B is a schematic top view of a partial structure of an electro-optic modulator according to yet still some other embodiments of the present disclosure.

As shown in FIG. 8B, in some other embodiments of the present disclosure, the electro-optic modulator 100 is a folding-type electro-optic modulator. An electrode layer of the folding-type electro-optic modulator adopts an electrode arrangement design of GSGSG, and each of sub-electrodes and each of connecting electrodes are designed in a similar manner to that in the embodiment shown in FIG. 5, in which the first main electrode 11, the second main electrode 21, the third ground electrode 145, the third main electrode 31, and the fourth main electrode 41 are in a folded form as a whole and do no intersect with each other; and the first waveguide arm 131 and the second waveguide arm 132 (alternatively, the first waveguide arm 131 or the second waveguide arm 132) intersect(s) with one or more of the first main electrode 11, the second main electrode 21, the third ground electrode 145, the third main electrode 31, and the fourth main electrode 41, to form a bending delay. In this way, a transmission speed of waveguides and the transmission speed of the electrodes can be flexibly adjusted to achieve a match therebetween as much as possible, thereby reducing the transmission loss.

Figure 9A:
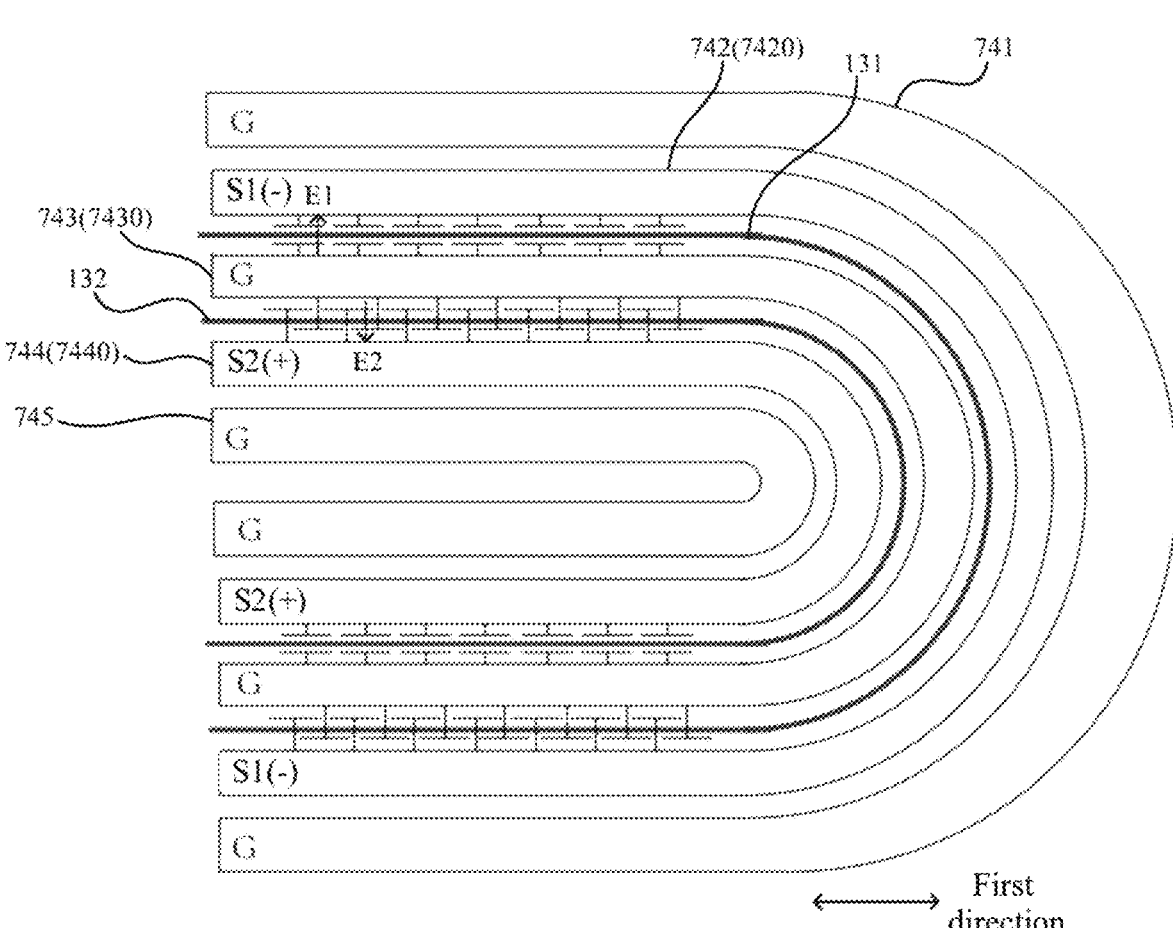
FIG. 9A is a schematic top view of a partial structure of an electro-optic modulator according to yet still some other embodiments of the present disclosure.

As shown in FIG. 9A, in some embodiments of the present disclosure, the electro-optic modulator 100 is a folding-type electro-optic modulator. An electrode layer of the folding-type electro-optic modulator adopts an electrode arrangement design of GSGSG, and various sub-electrodes and connecting electrodes are designed in a similar manner to that in the embodiment shown in FIG. 7, in which the first ground electrode 741, the second main electrode 7420, the first main electrode 7430, the third main electrode 7440, and the third ground electrode 745 are in a folded form as a whole and do no intersect with each other. In this embodiment, the first waveguide arm 131, the second waveguide arm 132, the first ground electrode 741, the second main electrode 7420, the first main electrode 7430, the third main electrode 7440, and the third ground electrode 745 are designed to not intersect with each other and to have substantially synchronized bends.

Figure 9B:
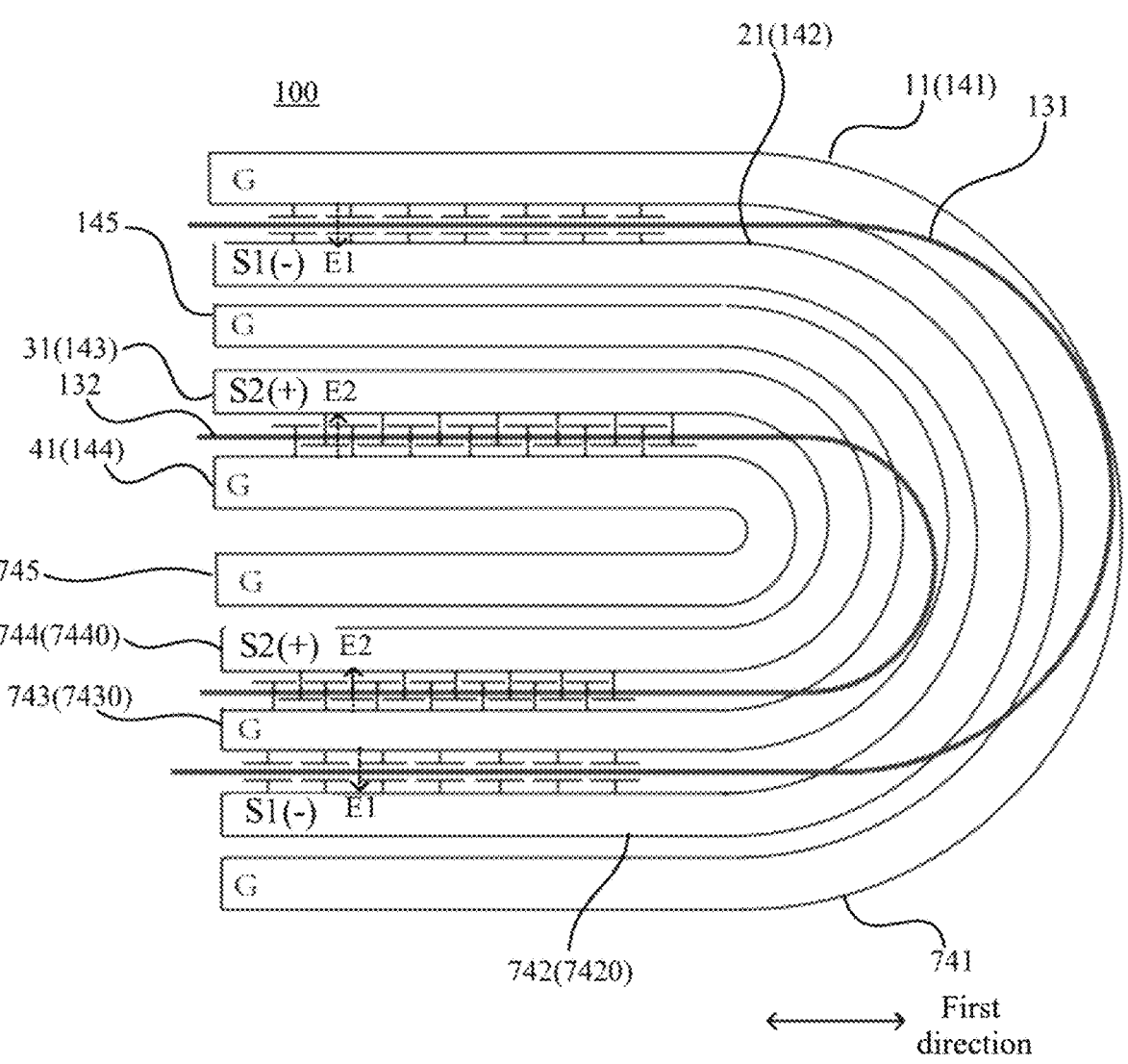
FIG. 9B is a schematic top view of a partial structure of an electro-optic modulator according to yet still some other embodiments of the present disclosure.

As shown in FIG. 9B, in some embodiments of the present disclosure, the electro-optic modulator 100 is a folding-type electro-optic modulator. An electrode layer of the folding-type electro-optic modulator adopts an electrode arrangement design of GSGSG, and some sub-electrodes and connecting electrodes are designed in a similar manner to that in the embodiment shown in FIG. 5, while some sub-electrodes and connecting electrodes are designed in a similar manner to that in the embodiment shown in FIG. 7, that is, a combined design of the embodiments shown in FIGS. 5 and 7 is adopted. The fourth main electrode 41 is in a bent-connection with the third ground electrode 745, the third main electrode 31 is in a bent-connection with the third main electrode 7440, the third ground electrode 145 is in a bent-connection with the first main electrode 7430, the second main electrode 21 is in a bent-connection with the second main electrode 7420, and the first main electrode 11 is in a bent-connection with the first ground electrode 741. The first waveguide arm 131 and the second waveguide arm 132 (alternatively, the first waveguide arm 131 or the second waveguide arm 132) intersect(s) with one or more of the above ground electrodes or main electrodes, to form a bending delay. In this way, a transmission speed of waveguides and the transmission speed of the electrodes can be flexibly adjusted to achieve a match therebetween as much as possible, thereby reducing the transmission loss.

The folding-type electro-optic modulator has an S-bend shape, which allows the device size to be reduced in a lengthwise direction. In order to obtain a better device performance, the length of the waveguide arm can be designed to increase as required, but because of the folding-type design, the length of the device is less affected, making it possible to implement miniaturized design of the device.

As shown in FIG. 3, in some embodiments of the present disclosure, the waveguide layer 130 adopts a ridge waveguide design, and further includes a slab waveguide 133. The first waveguide arm 131 and the second waveguide arm 132 are located on one side of the slab waveguide 133 that is away from the substrate 110 and are integrally connected to the slab waveguide 133, such that they can be integrally formed. The waveguide layer 130 adopts the ridge waveguide design, and thus has a series of excellent characteristics of a ridge waveguide, such as a low dominant mode cutoff frequency, a wide band, and low impedance.

In conclusion, by means of the design of the electro-optic modulator 100 in the above embodiments of the present disclosure, not only can the electric fields that act upon the two waveguide arms be designed to have opposite directions, but also the spacing between the signal electrode and the ground electrode can be shortened, such that the strength of the electric fields can be increased, and the transmission loss of the electrical signals can be reduced.

It should be understood that, in this description, the orientations or positional relationships or dimensions denoted by the terms, such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial" and "circumferential", are the orientations or positional relationships or dimensions shown on the basis of the accompanying drawings, and these terms are used merely for ease of description, rather than indicating or implying that the device or element referred to must have particular orientations and be constructed and operated in the particular orientations, and therefore should not be construed as limiting the scope of protection of the present disclosure.

In addition, the terms such as "first", "second" and "third" are merely for descriptive purposes and should not be construed as indicating or implying relative importance or implicitly indicating the number of technical features indicated. Thus, the features defined with "first", "second" and "third" may explicitly or implicitly include one or more features. In the description of the present disclosure, the term "a plurality of" means two or more, unless otherwise explicitly and specifically defined.

In the present disclosure, unless expressly stated or defined otherwise, the terms such as "mounting", "connection", "connected" and "fixing" should be interpreted broadly, for example, they may be a fixed connection, a detachable connection, or an integrated connection; may be mechanical connection, or electrical connection, or communication; and may be a direct connection or an indirect connection by means of an intermediate medium, or may be internal communication between two elements or interaction between the two elements. For those of ordinary skill in the art, the specific meanings of the above terms in the present disclosure can be understood according to specific circumstances.

In the present disclosure, unless expressly stated or defined otherwise, the expression of the first feature being "above" or "below" the second feature may include the case that the first feature is in direct contact with the second feature, or the case that the first feature and the second feature are not in direct contact but are contacted via another feature therebetween. Furthermore, the first feature being "over", "above" or "on" the second feature includes the case that the first feature is directly or obliquely above the second feature, or merely indicates that the first feature is at a higher level than the second feature. The first feature being "below", "under" or "beneath" the second feature includes the case that the first feature is directly or obliquely below the second feature, or merely indicates that the first feature is at a lower level than the second feature.

This description provides many different implementations or examples that can be used to implement the present disclosure. It should be understood that these different implementations or examples are purely illustrative and are not intended to limit the scope of protection of the present disclosure in any way. On the basis of the disclosure of the description of the present disclosure, those skilled in the art will be able to conceive of various changes or substitutions. All these changes or substitutions shall fall within the scope of protection of the present disclosure. Therefore, the scope of protection of the present disclosure shall be subject to the scope of protection of the claims.

What is claimed is:

1. An electro-optic modulator, comprising a substrate, an isolating layer, a waveguide layer, and an electrode layer, wherein the substrate, the isolating layer, the waveguide layer, and the electrode layer are arranged in sequence, wherein the electrode layer comprises: a plurality of first sub-electrodes arranged in sequence in a first direction and a plurality of first connecting electrodes connected to the plurality of first sub-electrodes in an intersecting manner in a one-to-one correspondence; a plurality of second sub-electrodes arranged in sequence in the first direction and a plurality of second connecting electrodes connected to the plurality of second sub-electrodes in an intersecting manner in a one-to-one correspondence; a plurality of third sub-electrodes arranged in sequence in the first direction and a plurality of third connecting electrodes connected to the plurality of third sub-electrodes in an intersecting manner in a one-to-one correspondence; and a plurality of fourth sub-electrodes arranged in sequence in the first direction and a plurality of fourth connecting electrodes connected to the plurality of fourth sub-electrodes in an intersecting manner in a one-to-one correspondence, wherein the plurality of first sub-electrodes and the plurality of fourth sub-electrodes are configured to be grounded, the plurality of second sub-electrodes and the plurality of third sub-electrodes are configured to receive differential signals, the plurality of first sub-electrodes and the plurality of second sub-electrodes are configured to form a first electric field therebetween, and the plurality of third sub-electrodes and the plurality of fourth sub-electrodes are configured to form a second electric field therebetween that has an opposite direction to that of the first electric field; and the waveguide layer comprises a first waveguide arm and a second waveguide arm, in a cross sectional view of the substrate that is perpendicular to the first direction, the first waveguide arm is located between the plurality of first sub-electrodes and the plurality of second sub-electrodes and does not intersect with the plurality of first connecting electrodes and the plurality of second connecting electrodes, and the second waveguide arm is located between the plurality of third sub-electrodes and the plurality of fourth sub-electrodes and overlaps with the plurality of third connecting electrodes and the plurality of fourth connecting electrodes.

2. The electro-optic modulator according to claim 1, wherein the electrode layer comprises a first ground electrode, a first signal electrode, a second signal electrode, and a second ground electrode, wherein the first ground electrode, the first signal electrode, the second signal electrode, and the second ground electrode are arranged in sequence, the first signal electrode and the second signal electrode being configured to receive differential signals, wherein the first ground electrode comprises a first main electrode, the plurality of first connecting electrodes connected to the first main electrode, and the plurality of first sub-electrodes;

the first signal electrode comprises a second main electrode, the plurality of second connecting electrodes connected to the second main electrode, and the plurality of second sub-electrodes;

the second signal electrode comprises a third main electrode, the plurality of third connecting electrodes connected to the third main electrode, and the plurality of third sub-electrodes; and the second ground electrode comprises a fourth main electrode, the plurality of fourth connecting electrodes connected to the fourth main electrode, and the plurality of fourth sub-electrodes.

3. The electro-optic modulator according to claim 2, wherein a distance from each of the second main electrode and the third main electrode to the substrate is h1, and a distance from each of the first main electrode and the fourth main electrode to the substrate is h2, wherein h1≠h2.

4. The electro-optic modulator according to claim 2, wherein the first main electrode, the second main electrode, the third main electrode, and the fourth main electrode are in a folded form as a whole and do no intersect with each other;

the first waveguide arm and the second waveguide arm intersect with none of the first main electrode, the second main electrode, the third main electrode, and the fourth main electrode; or at least one of the first waveguide arm and the second waveguide arm intersects with one or more of the first main electrode, the second main electrode, the third main electrode, and the fourth main electrode.

5. The electro-optic modulator according to claim 2, wherein the electrode layer further comprises: a third ground electrode located between the first signal electrode and the second signal electrode.

6. The electro-optic modulator according to claim 5, wherein the first main electrode, the second main electrode, the third ground electrode, the third main electrode, and the fourth main electrode are in a folded form as a whole and do no intersect with each other;

the first waveguide arm and the second waveguide arm intersect with none of the first main electrode, the second main electrode, the third ground electrode, the third main electrode, and the fourth main electrode; or at least one of the first waveguide arm and the second waveguide arm intersects with one or more of the first main electrode, the second main electrode, the third ground electrode, the third main electrode, and the fourth main electrode.

7. The electro-optic modulator according to claim 1, wherein the electrode layer comprises a first ground electrode, a first signal electrode, a second ground electrode, a second signal electrode, and a third ground electrode, wherein the first ground electrode, the first signal electrode, the second ground electrode, the second signal electrode, and the third ground electrode are arranged in sequence, the first signal electrode and the second signal electrode being configured to receive differential signals, wherein the second ground electrode comprises: a first main electrode, the plurality of first connecting electrodes located on one side of the first main electrode and connected to the first main electrode, and the plurality of first sub-electrodes, and the plurality of fourth connecting electrodes located on the other side of the first main electrode and connected to the first main electrode, and the plurality of fourth sub-electrodes;

the first signal electrode comprises a second main electrode, the plurality of second connecting electrodes connected to the second main electrode, and the plurality of second sub-electrodes; and the second signal electrode comprises a third main electrode, the plurality of third connecting electrodes connected to the third main electrode, and the plurality of third sub-electrodes.

8. The electro-optic modulator according to claim 7, wherein a distance from each of the second main electrode and the third main electrode to the substrate is h3, and a distance from each of the first ground electrode, the third ground electrode, and the first main electrode to the substrate is h4, wherein h3≠h4.

9. The electro-optic modulator according to claim 7, wherein the first ground electrode, the second main electrode, the first main electrode, the third main electrode, and the third ground electrode are in a folded form as a whole and do no intersect with each other;

the first waveguide arm and the second waveguide arm intersect with none of the first ground electrode, the second main electrode, the first main electrode, the third main electrode, and the third ground electrode; or at least one of the first waveguide arm and the second waveguide arm intersects with one or more of the first ground electrode, the second main electrode, the first main electrode, the third main electrode, and the third ground electrode.

10. The electro-optic modulator according to claim 1, wherein each of the first sub-electrodes is in a T-shaped or an L-shaped connection with a corresponding one of the first connecting electrodes;

each of the second sub-electrodes is in a T-shaped or an L-shaped connection with a corresponding one of the second connecting electrodes;

each of the third sub-electrodes is in a T-shaped or an L-shaped connection with a corresponding one of the third connecting electrodes; and each of the fourth sub-electrodes is in a T-shaped or an L-shaped connection with a corresponding one of the fourth connecting electrodes.

11. The electro-optic modulator according to claim 1, wherein in the first direction, the plurality of first sub-electrodes are arranged opposite the plurality of second sub-electrodes in a one-to-one correspondence, and the plurality of third sub-electrodes are arranged alternately with the plurality of fourth sub-electrodes.

12. The electro-optic modulator according to claim 1, wherein the waveguide layer further comprises:

a slab waveguide, and the first waveguide arm and the second waveguide arm are located on one side of the slab waveguide that is away from the substrate.

13. The electro-optic modulator according to claim 1, wherein the electro-optic modulator further comprises:

an optical-splitting element, which comprises a signal input end, a first optical-splitting output end, and a second optical-splitting output end, wherein one end of the first waveguide arm and one end of the second waveguide arm are connected to the first optical-splitting output end and the second optical-splitting output end in a one-to-one correspondence; and an optical-combining element, which comprises a first optical-splitting input end, a second optical-splitting input end, and a signal output end, wherein an other end of the first waveguide arm and an other end of the second waveguide arm are connected to the first optical-splitting input end and the second optical-splitting input end in a one-to-one correspondence.

* * * * *